US012605899B2

(12) United States Patent
Feller et al.

(10) Patent No.: US 12,605,899 B2
(45) Date of Patent: Apr. 21, 2026

(54) CENTRIFUGAL SEPARATOR FOR CLEANING ADDITIVELY MANUFACTURED OBJECTS WITH ADJUSTABLE MOUNT

(71) Applicant: Carbon, Inc., Redwood City, CA (US)

(72) Inventors: Bob E. Feller, San Mateo, CA (US); W. Ryan Powell, Sunnyvale, CA (US); Mark O. Kaufman, Mountain View, CA (US)

(73) Assignee: Carbon, Inc., Redwood City, CA (US)

( * ) Notice: Subject to any disclaimer, the term of this patent is extended or adjusted under 35 U.S.C. 154(b) by 348 days.

(21) Appl. No.: 18/298,721

(22) Filed: Apr. 11, 2023

(65) Prior Publication Data

US 2023/0330937 A1     Oct. 19, 2023

Related U.S. Application Data

(60) Provisional application No. 63/330,533, filed on Apr. 13, 2022.

(51) Int. Cl.
  B29C 64/35     (2017.01)
  B29C 64/124     (2017.01)
  (Continued)

(52) U.S. Cl.
  CPC ............ B29C 64/35 (2017.08); B29C 64/124 (2017.08); B29C 71/00 (2013.01); B33Y 10/00 (2014.12); B33Y 40/20 (2020.01)

(58) Field of Classification Search
  CPC ....... B29C 64/35; B29C 64/124; B29C 71/00; B33Y 10/00; B33Y 40/20
  See application file for complete search history.

(56) References Cited

U.S. PATENT DOCUMENTS 3,013,365 A     12/1961   Harper
3,392,455 A      7/1968   Kingsbaker et al.
      (Continued)

FOREIGN PATENT DOCUMENTS

CA        2979651 A1     3/2019
CN      104303105 A      1/2015
      (Continued)

OTHER PUBLICATIONS

Dendukuri, Dhananjay , et al., "Continuous-flow lithography for high-throughput microparticle synthesis", Nature Materials, 5, 2006, 365-369.
      (Continued)

*Primary Examiner* — Jerzi H Moreno Hernandez
(74) *Attorney, Agent, or Firm* — Myers Bigel, P.A.

(57)     ABSTRACT

A method of cleaning residual resin from an additively manufactured object, including: producing by additive manufacturing at least one object on at least one carrier platform; operatively connecting each object to a rotor including connecting the at least one carrier platform to a dynamic mount; separating residual resin from each object; and removing the at least one object from the rotor with the residual resin separated therefrom. The separating step may include: centrifugally separating the residual resin from each object by spinning the rotor with the at least object operatively connected thereto; and rotating each object about first and second axes during the spinning to enhance the centrifugally separating the residual resin from each object. The rotating step may be carried out with first and second actuators contacting and engaging the dynamic mount to rotate the dynamic mount and each object about the first and second axes.

8 Claims, 14 Drawing Sheets

(51) Int. Cl.
  B29C 71/00 (2006.01)
  B33Y 40/20 (2020.01)
  B33Y 10/00 (2015.01)

(56) References Cited

U.S. PATENT DOCUMENTS

| | | | |
|---|---|---|---|
| 3,871,394 | A | 3/1975 | Thegerstrom |
| 4,087,924 | A | 5/1978 | Fujimoro et al. |
| 4,262,430 | A | 4/1981 | Janson et al. |
| 4,688,513 | A | 8/1987 | Eberle |
| 5,122,441 | A | 6/1992 | Lawton et al. |
| 5,236,637 | A | 8/1993 | Hull |
| 5,248,456 | A | 9/1993 | Evans et al. |
| 5,355,638 | A | 10/1994 | Hoffman |
| 5,391,072 | A | 2/1995 | Lawton et al. |
| 5,482,659 | A | 1/1996 | Sauerhoefer |
| 5,581,905 | A | 12/1996 | Huelsman et al. |
| 7,114,943 | B1 | 10/2006 | Fong et al. |
| 7,118,714 | B2 | 10/2006 | Neimark |
| 7,438,846 | B2 | 10/2008 | John |
| 7,709,544 | B2 | 5/2010 | Doyle et al. |
| 7,845,930 | B2 | 12/2010 | Shkolnik et al. |
| 7,892,474 | B2 | 2/2011 | Shkolnik et al. |
| 7,980,494 | B2 | 7/2011 | Zapp |
| 8,110,135 | B2 | 2/2012 | El-Siblani |
| 8,695,813 | B2 | 4/2014 | Carson et al. |
| 8,735,049 | B2 | 5/2014 | Vest |
| 8,776,391 | B1 * | 7/2014 | Kaza .................... A61C 13/00 |
| | | | 34/317 |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,347,707 | B2 | 5/2016 | Struschka et al. |
| 9,360,757 | B2 | 6/2016 | Desimone et al. |
| 9,498,920 | B2 | 11/2016 | Desimone et al. |
| 9,511,546 | B2 | 12/2016 | Chen et al. |
| 9,592,539 | B2 | 3/2017 | Dunn et al. |
| 9,724,302 | B2 | 8/2017 | Schutt et al. |
| 9,993,974 | B2 | 6/2018 | Desimone et al. |
| 10,004,578 | B1 | 6/2018 | Kaza et al. |
| 10,016,938 | B2 | 7/2018 | Desimone et al. |
| 10,093,064 | B2 | 10/2018 | Desimone et al. |
| 10,144,181 | B2 | 12/2018 | Desimone et al. |
| 10,150,253 | B2 | 12/2018 | Desimone et al. |
| 10,596,755 | B2 | 3/2020 | Desimone et al. |
| 10,618,215 | B2 | 4/2020 | Desimone et al. |
| 10,779,915 | B1 | 9/2020 | Kaza et al. |
| 10,913,206 | B2 | 2/2021 | Donovan et al. |
| 11,084,216 | B2 | 8/2021 | Murillo et al. |
| 11,247,389 | B2 | 2/2022 | Converse et al. |
| 11,284,972 | B2 | 3/2022 | Kaza et al. |
| 11,284,973 | B2 | 3/2022 | Kaza et al. |
| 11,284,974 | B2 | 3/2022 | Kaza et al. |
| 11,433,658 | B2 | 9/2022 | Friedrich et al. |
| 11,440,259 | B2 | 9/2022 | Price et al. |
| 11,478,988 | B2 | 10/2022 | Murillo et al. |
| 11,484,395 | B1 | 11/2022 | Kaza et al. |
| 11,491,725 | B2 | 11/2022 | Feller et al. |
| 11,730,574 | B2 | 8/2023 | Kaza et al. |
| 12,092,397 | B2 | 9/2024 | Andrews et al. |
| 2003/0206820 | A1 | 11/2003 | Keicher et al. |
| 2004/0148048 | A1 | 7/2004 | Farnworth |
| 2004/0159340 | A1 | 8/2004 | Hiatt et al. |
| 2004/0159344 | A1 | 8/2004 | Hiatt et al. |
| 2006/0022379 | A1 | 2/2006 | Wicker et al. |
| 2006/0231125 | A1 | 10/2006 | Yi |
| 2007/0179655 | A1 | 8/2007 | Farnworth |
| 2008/0087298 | A1 | 4/2008 | Katou et al. |
| 2009/0283119 | A1 * | 11/2009 | Moussa .................. B29C 64/35 |
| | | | 134/147 |
| 2011/0089610 | A1 | 4/2011 | El-Siblani et al. |
| 2011/0273684 | A1 | 11/2011 | Owa et al. |
| 2011/0309554 | A1 | 12/2011 | Liska et al. |

| | | | |
|---|---|---|---|
| 2013/0292862 | A1 | 11/2013 | Joyce |
| 2013/0295212 | A1 | 11/2013 | Chen et al. |
| 2015/0331402 | A1 | 11/2015 | In et al. |
| 2015/0360419 | A1 | 12/2015 | Willis et al. |
| 2016/0045841 | A1 | 2/2016 | Kaplan et al. |
| 2016/0137839 | A1 | 5/2016 | Rolland et al. |
| 2017/0129167 | A1 | 5/2017 | Castanon |
| 2017/0129169 | A1 | 5/2017 | Batchelder et al. |
| 2017/0173872 | A1 | 6/2017 | Mccall et al. |
| 2017/0312763 | A1 | 11/2017 | Mackel et al. |
| 2017/0322487 | A1 | 11/2017 | Baur et al. |
| 2018/0029311 | A1 | 2/2018 | Depalma et al. |
| 2018/0099300 | A1 | 4/2018 | Dufort et al. |
| 2018/0304526 | A1 | 10/2018 | Feller et al. |
| 2019/0029311 | A1 | 1/2019 | Shin et al. |
| 2019/0126547 | A1 | 5/2019 | Desimone et al. |
| 2019/0184635 | A1 | 6/2019 | Garrett et al. |
| 2019/0224917 | A1 | 7/2019 | Venkatakrishnan et al. |
| 2019/0389127 | A1 | 12/2019 | Desimone et al. |
| 2020/0139617 | A1 | 5/2020 | Desimone et al. |
| 2020/0198242 | A1 | 6/2020 | John |
| 2020/0215811 | A1 * | 7/2020 | Friedrich ............... B33Y 40/20 |
| 2020/0337813 | A1 | 10/2020 | Kirchner et al. |
| 2021/0086450 | A1 * | 3/2021 | Murillo .................. B29C 64/35 |
| 2021/0213675 | A1 | 7/2021 | Converse et al. |
| 2021/0308947 | A1 | 10/2021 | Diez et al. |
| 2021/0323234 | A1 | 10/2021 | Day et al. |
| 2023/0027112 | A1 | 1/2023 | Feller et al. |
| 2023/0137027 | A1 * | 5/2023 | Meenakshisundaram .................. |
| | | | B29C 64/357 |
| | | | 264/401 |

FOREIGN PATENT DOCUMENTS

| | | | |
|---|---|---|---|
| DE | 102014010501 A1 | 1/2016 | |
| EP | 1700656 A2 | 9/2006 | |
| EP | 1700686 A2 | 9/2006 | |
| EP | 2813220 A2 | 12/2014 | |
| JP | 2001342204 A | 12/2001 | |
| JP | 2015112929 A | 6/2015 | |
| JP | 2015120261 A | 7/2015 | |
| WO | 0172501 A1 | 10/2001 | |
| WO | 2011086450 A2 | 7/2011 | |
| WO | 2017194177 A1 | 11/2017 | |
| WO | 2018111548 A1 | 6/2018 | |
| WO | 2019209732 A1 | 10/2019 | |
| WO | 2020069152 A1 | 4/2020 | |
| WO | 2021222086 A1 | 11/2021 | |
| WO | 2022076235 A1 | 4/2022 | |
| WO | WO-2022260921 A1 * | 12/2022 | ............. B29C 64/35 |

OTHER PUBLICATIONS

Dendukuri, Dhananjay , et al., "Modeling of Oxygen-Inhibited Free Radical Photopolymerization in a PDMS Microfluidic Device", Macromolecules, 41, 2008, 8547-8556.

Dendukuri, Dhananjay , et al., "Stop-flow lithography in a microfluidic device", The Royal Society of Chemistry, Lab on a Chip, 7, 2007, 818-828.

Morelli, Dean , "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, (37 pages).

Pan, Yayue , et al., "A Fast Mask Projection Stereolithography Process for Fabricating Digital Models in Minutes", J. Manufacturing Sci. and Eng. 134(5), 2012, 051011-1-9.

Stern, S. A., "The "Barrer" Permeability Unit", Journal of Polymer Science: Part A-2, 6(11), 1968, 1933-1934.

Tumbleston, John R., et al., "Continuous liquid interface production of 3D Objects", Science, 347(6228), 2015, 1349-1352.

Yasuda, H. , et al., "Permeability of Polymer Membranes to Dissolved Oxygen", Journal of Polymer Science, 4, 1966, 1314-1316.

* cited by examiner

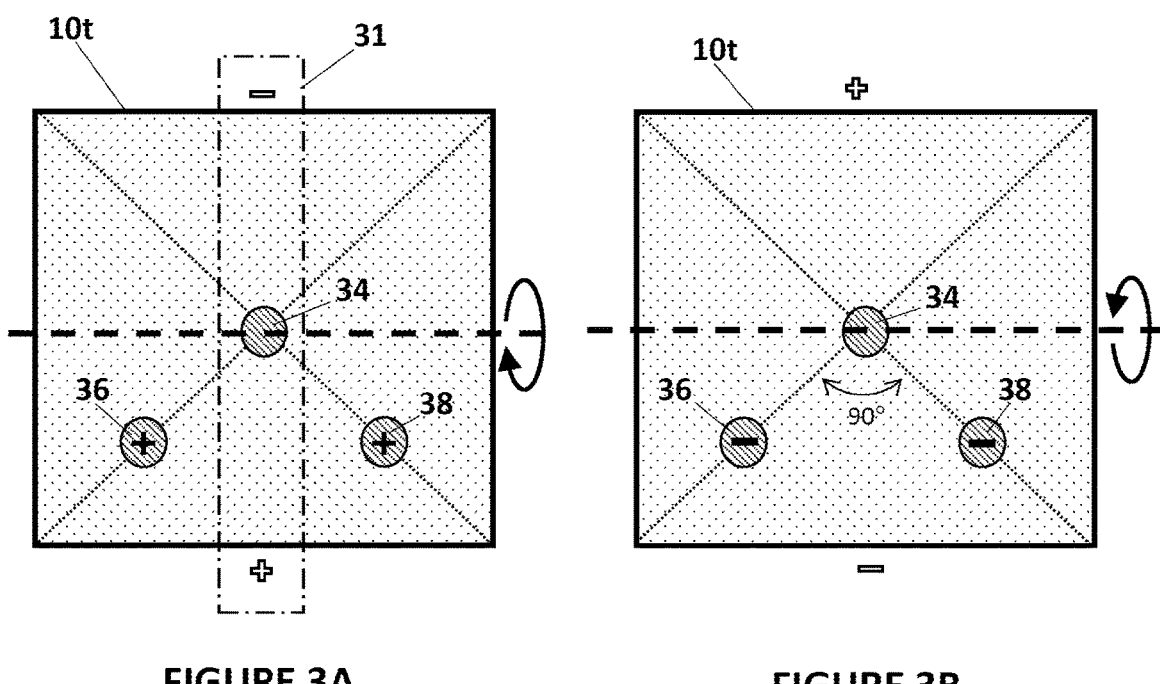
FIGURE 3A                    FIGURE 3B
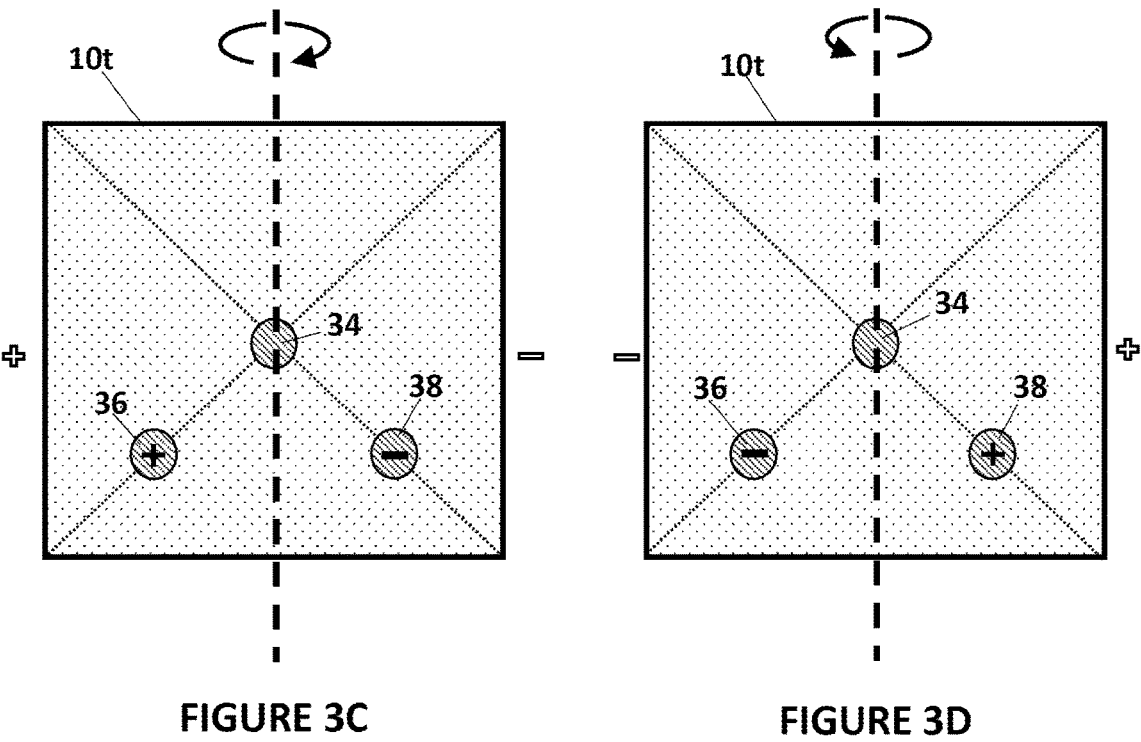
FIGURE 3C                    FIGURE 3D

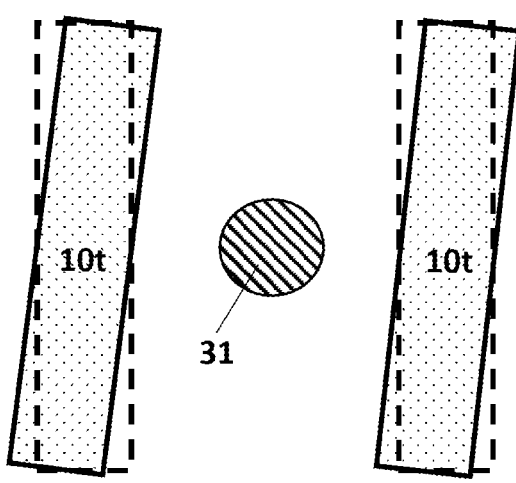
FIGURE 4A: Top view.
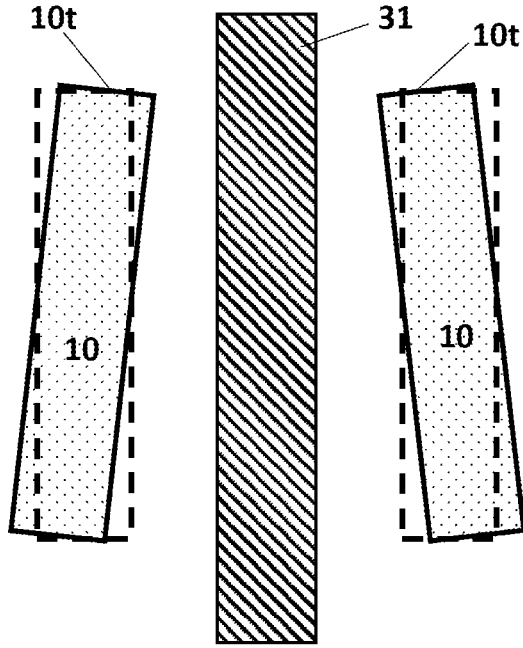
FIGURE 4B: Side view.

CENTRIFUGAL SEPARATOR FOR CLEANING ADDITIVELY MANUFACTURED OBJECTS WITH ADJUSTABLE MOUNT

RELATED APPLICATIONS

This application claims priority from U.S. Provisional Application Ser. No. 63/330,533, filed Apr. 13, 2022, the disclosure of which is hereby incorporated by reference in its entirety.

FIELD OF THE INVENTION

The present invention concerns methods and apparatus for separating residual resin from the surface of an additively manufactured object.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598, 606).

Stereolithography resins are generally viscous. As a result, excess, unpolymerized, resin adheres to the surface of such objects after they have been produced. This resin must be removed for further processing or use, but removal of such residual resin can be difficult.

Residual resin can also be removed by washing the objects in a liquid, such as described in McCall, Rolland, and Converse, U.S. Pat. No. 10,343,331. While washing can remove significant amounts of residual resin, it can also damage the underlying object, such as by extracting constituents of a dual cure resin required for the second cure.

Residual resin can also be removed by centrifugal separation, such as described in Murillo and Dachs, Resin extractor for additive manufacturing, PCT Patent App. Pub. No. WO2019/209732 (31 Oct. 2019). High spin speeds can, however, cause distortion of the object, and low spin speeds can result in insufficient removal of residual resin. This reference suggests spraying a solvent (isopropanol) on an object during centrifugal separation to facilitate resin removal, but the potential for damaging the underlying object by contacting it to excessive solvent remains.

Accordingly, there remains a need for new approaches to separating residual resin from additively manufactured objects.

SUMMARY OF THE INVENTION

Some embodiments of the present invention are directed to a method of cleaning residual resin from an additively manufactured object, the method including: producing by additive manufacturing (that is, stereolithography) at least one object on at least one carrier platform, each object including a light polymerized resin with a surface coating of viscous, unpolymerized residual resin; operatively connecting each object to a rotor; separating the residual resin from each object; and removing the at least one object from the rotor with the residual resin separated therefrom. The separating step may include: centrifugally separating the residual resin from each object by spinning the rotor with the at least object operatively connected thereto; and rotating (or tilting) each object about at least one axis during the spinning to enhance the centrifugally separating the residual resin from each object.

In some embodiments: operatively connecting each object to the rotor includes operatively connecting each carrier platform to the rotor, rotating (or tilting) each object includes rotating (or tilting) each carrier platform, and/or removing the at least one object from the rotor includes removing the at least one carrier platform from the rotor.

In some embodiments, the rotating step includes rotating each carrier platform about each axis in a repeating pattern of rotating the carrier platform in a first direction and then rotating the carrier platform in a second, opposite direction.

In some embodiments, the rotating step includes rotating each carrier platform about first and second axes (e.g., simultaneously).

In some embodiments, the at least one carrier platform includes first and second carrier platforms disposed on diametrically opposed sides of the rotor.

In some embodiments, the rotating step includes: rotating the first and second carrier platforms about the first axis simultaneously in the same direction; and/or rotating the first and second carrier platforms about the second axis simultaneously in opposite directions.

In some embodiments, the first axis is a horizontal axis (e.g., pitch axis) and the second axis is a vertical axis (e.g., yaw axis).

In some embodiments, the rotating step is carried out with a plurality of actuators engaging a dynamic mount to which the carrier platform is operatively connected.

In some embodiments, the method further includes receiving each carrier platform in at least one vapor chamber to operatively connect each carrier platform to the rotor.

In some embodiments, the method further includes flooding the at least one vapor chamber with a volatile organic solvent vapor, with the vapor present in an amount sufficient to reduce the viscosity of the residual resin.

In some embodiments, operatively connecting each object to the rotor includes positioning each object in or on a connection feature (e.g., a basket, a cage, a rack, an engagement feature such as a rod or skewer, etc.). In some embodiments, rotating (or tilting) each object includes rotating (or tilting) the connection feature.

Some other embodiments of the present invention are directed to an apparatus for separating residual resin from additively manufactured objects, the apparatus including: a rotor; first and second carrier platform mount assemblies (or mount assemblies) connected to the rotor, each carrier platform mount assembly (or mount assembly) configured to have a carrier platform connected thereto (or configured to have a vapor chamber connected thereto with a carrier platform mounted therein); a plurality of actuators configured to engage each carrier platform mount assembly (or each mount assembly) to thereby rotate the carrier platform mount assembly and the carrier platform connected thereto about first and second axes (or to rotate the vapor chamber with the carrier platform therein about first and second axes).

In some embodiments, the apparatus further includes a drive assembly configured to spin the rotor while the actuators rotate the carrier platform mount assemblies.

In some embodiments, the apparatus further includes at least one controller operatively associated with the drive assembly and/or the actuators.

In some embodiments, the first axis is a horizontal axis (e.g., pitch axis) and the second axis is a vertical axis (e.g., yaw axis).

In some embodiments, the actuators are configured to repeatedly rotate each carrier platform mount assembly about each axis alternately in a first direction and a second, opposite direction.

In some embodiments, the actuators are configured to rotate the first and second carrier platform mount assemblies simultaneously about the first axis in the same direction and are configured to rotate the first and second carrier platform mount assemblies simultaneously about the second axis in opposite directions.

In some embodiments, each carrier platform mount assembly includes a dynamic mount having first and second opposite sides or surfaces, with the first surface configured to have the carrier platform connected thereto.

In some embodiments, the plurality of actuators include first and second actuators for each carrier platform mount assembly. The apparatus may further include a first arm extending from a main body of the first actuator to a first spherical bearing at the second surface of the dynamic mount and a second arm extending from a main body of the second actuator to a second spherical bearing at the second surface of the dynamic mount.

In some embodiments, the first and second spherical bearings are offset from a centerline of the dynamic mount.

Some other embodiments of the present invention are directed to an apparatus for separating residual resin from additively manufactured objects. The apparatus includes: (a) a spin chamber; (b) a spin rotor in the spin chamber; (c) at least two mount assemblies operatively associated with the spin rotor, each mount assembly configured for receiving at least one additively manufactured object; and (d) at least one (e.g., one, two, or three) vapor chamber(s) operatively associated with said spin rotor and configured to spin with said spin rotor within said spin chamber (and optionally, but in some embodiments preferably, with said spin rotor positioned outside each vapor chamber). The at least one vapor chamber is operatively associated with each of said mount assemblies and configured with each mount assembly to receive at least one additively manufactured object within said vapor chamber. The apparatus includes (e) an organic solvent vapor generator operatively associated with each at least one vapor chamber.

In some embodiments, the mount assembly includes a carrier platform mount assembly, the vapor chamber configured with the mount assembly to receive a carrier platform having additively manufactured objects formed thereon within said vapor chamber, with the carrier platform removably connected to the mount assembly.

In some embodiments, the spin chamber has an internal volume, the at least one vapor chamber has an internal volume, and the total internal volume of all of the at least one vapor chambers is not more than, or less than, than one half (½) or two thirds (⅔) the internal volume of the spin chamber (and optionally, but in some embodiments preferably, wherein the total internal volume of all of the at least one vapor chambers is not less than, or at least, one fifth (⅕) or one quarter (¼) of the internal volume of the spin chamber).

In some embodiments, the apparatus further includes: (f) a heater operatively associated with each vapor chamber (and optionally, but in some embodiments preferably, with the heater positioned on the outside surface portion of each vapor chamber).

In some embodiments, the apparatus further includes: (g) a blower operatively associated with each at least one vapor chamber and configured for circulating organic solvent vapor within each vapor chamber (for example, the blower including a motor operatively connected to a fan, and optionally, but in some embodiments preferably, with the motor positioned on the outside surface portion of each vapor chamber, and the fan positioned inside the vapor chamber).

In some embodiments, the apparatus further includes: (h) at least one internal vent opening (e.g., a pair of opposite facing internal vent openings) formed on each of the at least one vapor chambers, each internal vent openings having a seal mechanism (e.g., a door, shutter, diaphragm, or the like) operatively associated therewith, the seal mechanism switchable between a closed configuration in which solvent vapor is retained in each vapor chamber and an open configuration in which solvent vapor can be flushed from each vapor chamber.

In some embodiments, the apparatus further includes: (i) at least one actuator, or a plurality of actuators, configured to engage each carrier platform mount assembly to thereby rotate the carrier platform mount assembly and the carrier platform connected thereto about at least one axis, or about first and second axes (and optionally, but in some embodiments preferably, with the actuator(s) positioned outside of each said at least one vapor chamber).

In some embodiments, the apparatus further includes: (j) a balancer operatively associated with the spin rotor (e.g., a Leblanc balancer, a ball balancer, or a pendulum balancer).

In some embodiments, the apparatus further includes: (k) a pressure relief port formed in the spin chamber, the relief port having a frangible vapor barrier connected thereto (and in some embodiments, the pressure relief port further having a flame arrestor operatively associated therewith).

In some embodiments, the apparatus further includes: (l) an external vent opening formed on said spin chamber.

In some embodiments, the apparatus further includes: (m) an access door on the spin chamber configured for passage of the carrier platform having additively manufactured objects formed thereon; and (n) an access door on each the at least one vapor chamber configured for passage of the carrier platform having additively manufactured objects formed thereon.

Some other embodiments of the present invention are directed to a method of cleaning residual resin from an additively manufactured object. The method includes: stereolithographically producing at least one object, each object comprising a light polymerized resin with a surface coating of viscous, unpolymerized residual resin; receiving each object in at least one vapor chamber that is operatively connected to a rotor; then closing the at least one object within the at least one vapor chamber; optionally, but preferably, closing the at least one vapor chamber within a spin chamber; generating an organic solvent vapor in the at least one vapor chamber (in an amount) effective to reduce the viscosity of the unpolymerized residual resin; centrifugally separating the residual resin from the at least one object by spinning the rotor, thereby also spinning the at least one vapor chamber with the at least one object therein; and then opening the at least one vapor chamber (and the spin chamber where present and when previously closed), and removing each the at least one object therefrom.

In some embodiments, the step of closing the at least one vapor chamber within a spin chamber is included.

In some embodiments, each object is produced on at least one carrier platform, and the object is received in the vapor chamber by receiving the carrier platform with the object thereon in the vapor chamber.

In some embodiments, the solvent includes an acetate, alcohol, saturated or unsaturated hydrocarbon, an ether, or a combination thereof (e.g., ethyl acetate, isopropyl acetate, propyl acetate, butyl acetate, hexane, heptane, octane, isooctane (2,2,4 trimethylpentane), and combinations thereof).

In some embodiments, the method further includes heating each at least one vapor chamber (e.g., during the generating step and/or the centrifugally separating step).

In some embodiments, the organic solvent vapor is generated by evaporation of an organic solvent liquid (e.g., the liquid in a pool, a liquid stream such as a stream flowing over a heated or unheated surface such as a metal surface, evaporation from liquid solvent absorbed into and/or absorbed onto an optionally heated wick, etc.).

In some embodiments, the organic solvent vapor is generated by (i) producing an aerosol suspension (or mist) of the organic solvent in the vapor chamber from an organic solvent liquid, and then (ii) evaporating at least some of the aerosol suspension (or mist) to produce the organic solvent vapor (optionally but in some embodiments preferably by heating the chamber).

In some embodiments, the spin chamber is included, the spin chamber has an internal volume, the at least one vapor chamber has an internal volume, and the total internal volume of all of the at least one vapor chambers is not more than, or less than, one half (½) or two thirds (⅔) the internal volume of the spin chamber In some embodiments, the total internal volume of all of the at least one vapor chambers is not less than, or at least, one fifth (⅕) or one quarter (¼) of the internal volume of the spin chamber.

In some embodiments, the method further includes circulating the organic solvent vapor within each of the at least one vapor chamber during the centrifugally separating step (e.g., with a blower operatively associated with the vapor chamber).

In some embodiments, the method further includes, between the centrifugally separating step and the opening step, the step of: venting the organic solvent vapor from the at least one vapor chamber (e.g., by opening a vent, and from said spin chamber when present.

In some embodiments, the object is an electrical, mechanical, or fluid connector, a fluid conduit, a cushion including of a lattice of interconnected struts and/or a triply periodic surface lattice, a thermoforming mold for a dental appliance, or the like.

The foregoing and other objects and aspects of the present invention are explained in greater detail in the drawings herein and the specification set forth below. The disclosures of all United States patent references cited herein are to be incorporated herein by reference.

BRIEF DESCRIPTION OF THE DRAWINGS

FIGS. 3A-3D schematically illustrate, with reference to principle components of FIGS. 2A-2B, how a build platform can be rotated around an axis represented by the dashed line by motion of actuators (where a "+" represents extension of an actuator, and a "−" represents retraction of an actuator). The dashed rectangle in FIG. 3A represents a center shaft and would be in the same position for FIGS. 3B-3D.

FIG. 4A is a top plan view schematically illustrating how a pair of build platforms can be rotated in the same direction to maintain balance about a center shaft or rotor.

FIG. 4B is a side view schematically illustrating how a pair of build platforms can be rotated in opposite directions to maintain balance about a center rotor or shaft.

DETAILED DESCRIPTION OF ILLUSTRATIVE EMBODIMENTS

Figure 1A:
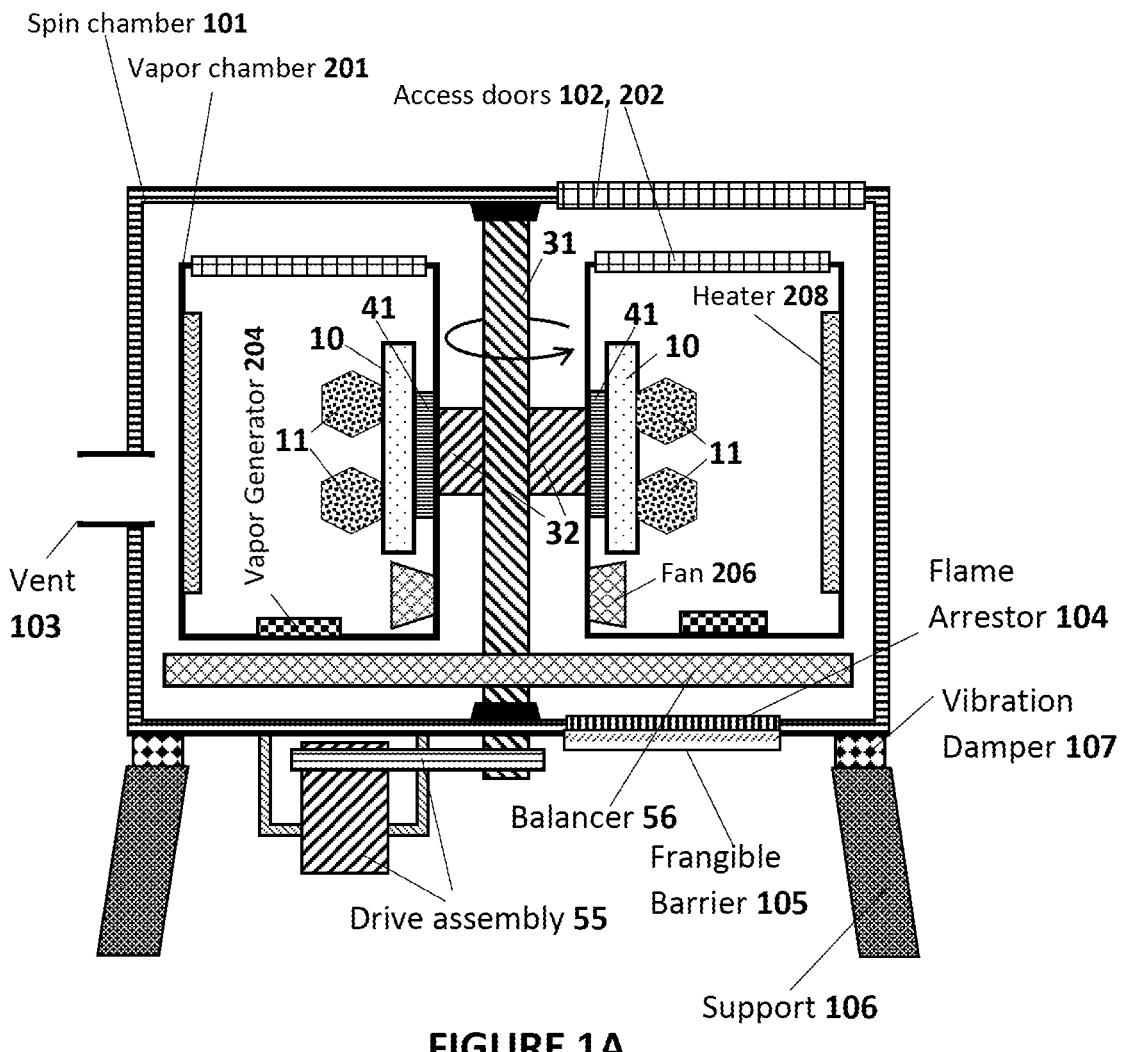
FIG. 1A schematically illustrates a first embodiment of a cleaning apparatus with a pair of separate, internal, vapor chambers.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing.

Techniques for producing an object, including "green" intermediate objects, from light polymerizable resins (including dual cure resins) by additive manufacturing are known. Suitable techniques include bottom-up and top-down additive manufacturing, generally known as stereolithography. Such methods are known and described in, for example, U.S. Pat. No. 5,247,180 to Mitcham and Nelson (Texas Instruments patent describing SLA with micromirror array); U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP include, but are not limited to: Batchelder et al., US Patent Application Pub. No. US 2017/0129169 (May 11, 2017); Sun and Lichkus, US Patent Application Pub. No. US 2016/0288376 (Oct. 6, 2016); Willis et al., US Patent Application Pub. No. US 2015/0360419 (Dec. 17, 2015); Lin et al., US Patent Application Pub. No. US 2015/0331402 (Nov. 19, 2015); D. Castanon, S Patent Application Pub. No. US 2017/0129167 (May 11, 2017). B. Feller, US Pat App. Pub. No. US 2018/0243976 (published Aug. 30, 2018); M. Panzer and J. Tumbleston, US Pat App Pub. No. US 2018/0126630 (published May 10, 2018); K. Willis and B. Adzima, US Pat App Pub. No. US 2018/0290374 (Oct. 11, 2018) L. Robeson et al., PCT Patent Pub. No, WO 2015/164234 (see also U.S. Pat. Nos. 10,259,171 and 10,434, 706); and C. Mirkin et al., PCT Patent Pub. No. WO 2017/210298 (see also US Pat. App. US 2019/0160733).

While any suitable resin can be used in the methods described herein, in some embodiments dual cure resins are preferred Such resins are known and described in, for example, U.S. Pat. Nos. 9,676,963, 9,453,142 and 9,598,606 to Rolland et al. Particular examples of suitable dual cure resins include, but are not limited to, Carbon Inc. medical polyurethane, elastomeric polyurethane, rigid polyurethane, flexible polyurethane, cyanate ester, epoxy, and silicone dual cure resins, all available from Carbon, Inc., 1089 Mills Way, Redwood City, California 94063 USA.

In some embodiments, the additively manufactured objects are formed on a carrier platform or build platform, and that platform can be moved to the cleaning apparatus with the objects retained thereon. While such embodiments are shown in particular detail below, note also that in other embodiments the additively manufactured objects can be removed from the build platform and transferred to the cleaning apparatus.

2. Spin Cleaning Apparatus and Methods.

A. Overview.

Figure 1B:
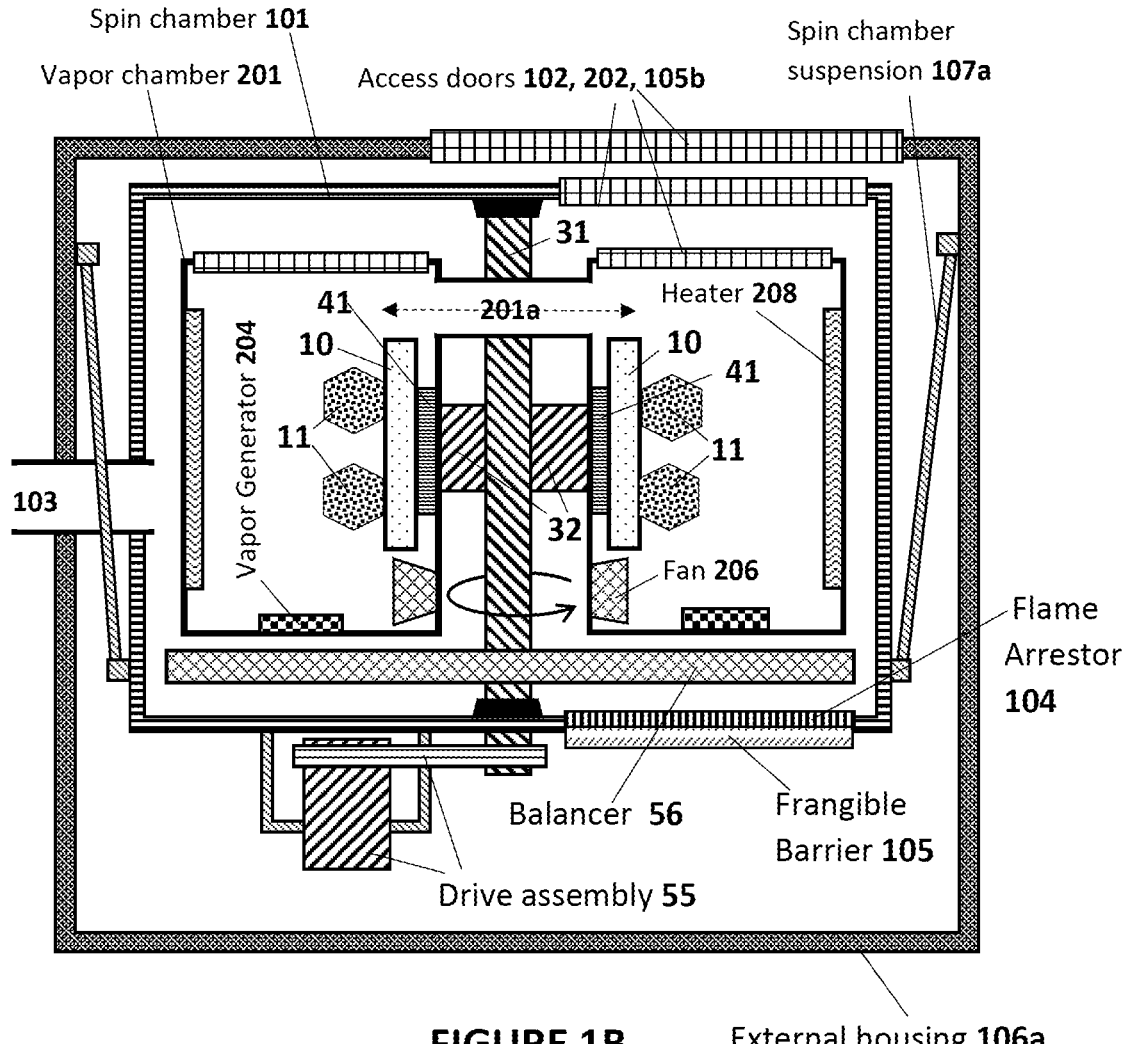
FIG. 1B schematically illustrates a second embodiment of a cleaning apparatus, with a pair of internal vapor chambers connected to one another with a vapor duct, thereby forming a single chamber with a pair of sub-chambers.

FIGS. 1A-1B schematically illustrate two different embodiments of a spin cleaning apparatus, each having additively manufactured objects 11 that have been produced on the build platforms 10 by methods as described above contained therein for cleaning. The additively manufactured objects have a coating of residual resin thereon to be centrifugally separated from the objects.

In the apparatus of FIGS. 1A-1B, the build platforms 10 are removably connected to a build platform mount 41. The build platform mount is connected to an adjustable or fixed rotor mount 32 which is in turn connected to a central shaft 31. As used herein, the term "mount assembly" may include one or both of the rotor mount 32 and the build platform mount 41. All are contained within a spin chamber 101. Each rotor mount 32 has a vapor chamber 201 connected thereto (the vapor chambers also contained within the spin chamber). Both the vapor chamber and the spin chamber have access doors 102, 202 through which build platforms and associated additively manufactured objects can be inserted for cleaning. The spin chamber preferably includes a vent 103 and in some embodiments a flame arrestor 104 (such as a metallic screen) sealed with a frangible barrier 105 such as a metallic foil, to contain solvent vapor when being exhausted (as discussed further below), but which can burst should an ignition event occur within the spin chamber.

In the embodiment of FIG. 1A, the spin chamber is supported by supports 106 and vibration dampers 107. In contrast, in the embodiment of FIG. 1B, the spin chamber is supported within an external housing or frame 106*a* by suspension members 107*a*. An additional access door 105*b* through the external housing may also be provided.

In the embodiment of FIG. 1B note the two rectangular-schematic vapor chambers are connected to one another by a flexible duct 201*a*. Thus the two vapor chambers function as sub-chambers of a single vapor chamber. Numerous different configurations of chambers and/or subchambers will be readily envisioned by those skilled in the art, all of which reduce the volume of space occupied by vapor as compared to the volume of the spin chamber, thereby reducing the volume of vapor available for an ignition event during at least some portions of the cleaning cycle.

In both the embodiment of FIG. 1A and the embodiment of FIG. 1B, a drive assembly 55 can be operatively associated with the rotor 31, directly or indirectly (e.g., a belt drive or gear drive) by any suitable technique. In preferred embodiments, a balancer 56 is also operatively associated with the rotor. Inclusion of a balancer advantageously permits mounting of multiple build platforms 10 carrying objects of different size, shape, and or/weight, or distributed in a different pattern on the build platforms. This is particularly advantageous for automated systems in which different build platforms mounted in the device carry objects of the same type (e.g., all dental molds; all midsoles, etc.) but the objects have automatically been generated in a different size or shape, and/or distributed in different patterns on different platforms. Suitable balancers include, but are not limited to, mechanical or passive balancers such as LeBlanc balancers (hydrodynamic balancers), ball balancers (including ring balancers), and pendulum balancers (See generally U.S. Pat. No. 1,209,730 to Leblanc; U.S. Pat. No. 2,549,756 to Kendall; M. Makram et al., *Effect of automatic ball balancer on unbalanced rotor vibration*, Paper ASAT-17-130-ST, 17th International Conference on Aerospace Sciences & Aviation Technology (Apr. 11-13, 2017)).

Additional details of FIGS. 1A-1B including vapor generator 204, fan 206, and heater 208 are discussed further below in Section C.

Note that the adjustable mount features described above and in Section B below can be used independently of, or in combination with, the internal vapor chamber features described above and in Section C below. Likewise, the internal vapor chamber features so described can be used independently of, or in combination with, the adjustable mount features so described.

B. Cleaning Apparatus Including Adjustable Mount to Rotor.

Figure 2A:
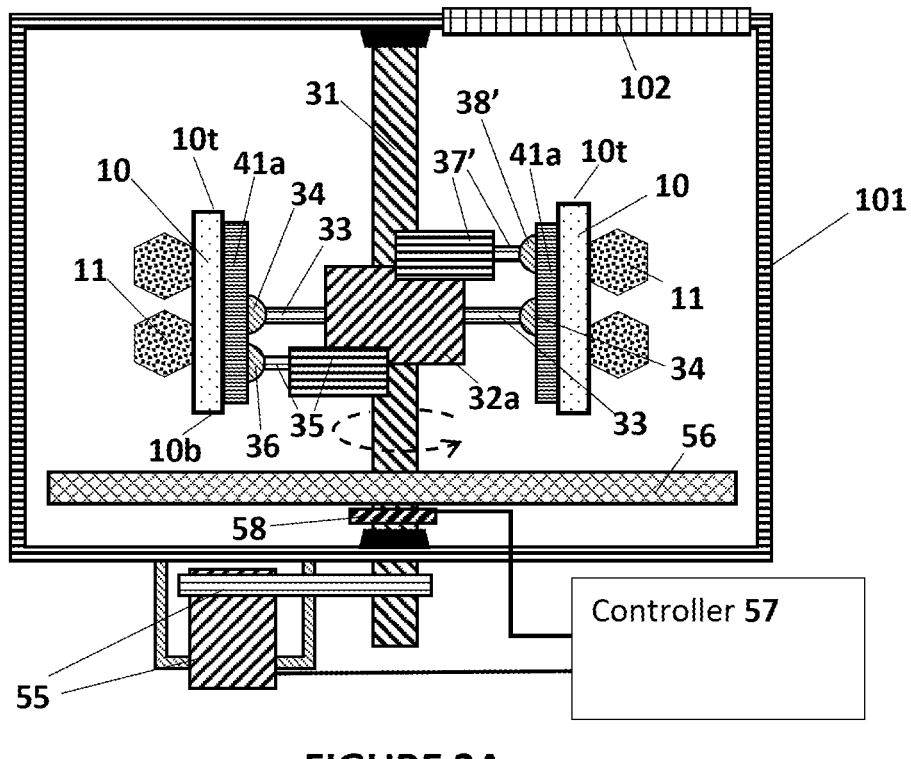
FIG. 2A is a side schematic view of a cleaning apparatus having an adjustable mount for the objects to be cleaned.
Figure 2B:
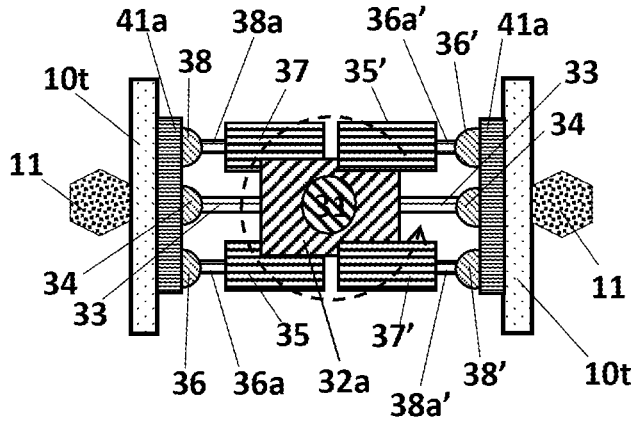
FIG. 2B is a top plan view of major portions of the apparatus of FIG. 2A.
Figure 5A:
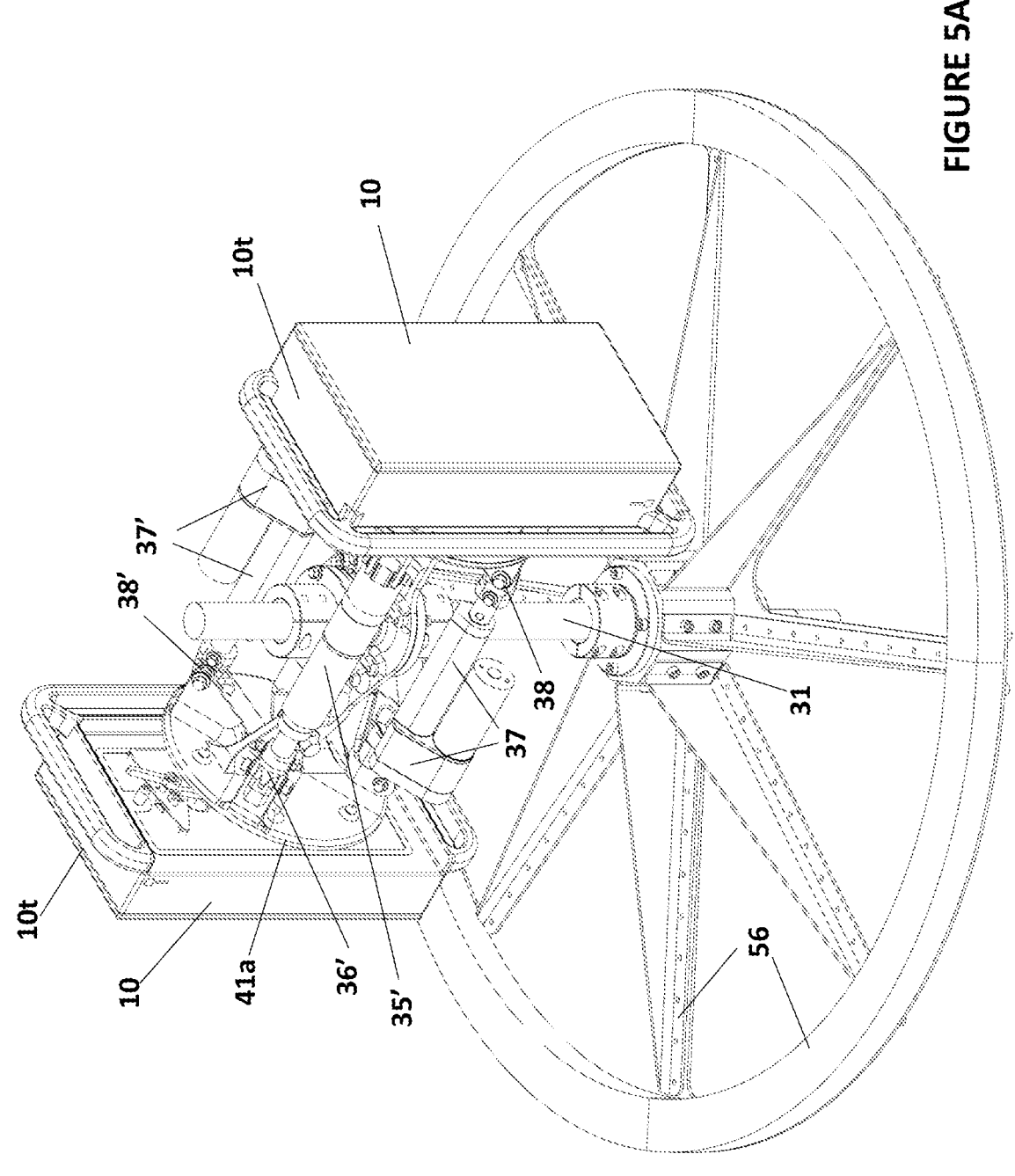
FIG. 5A is a perspective view of a subassembly of an apparatus as described herein, including center shaft, actuators, balancers, build platform mounts, and removable build platforms.
Figure 5B:
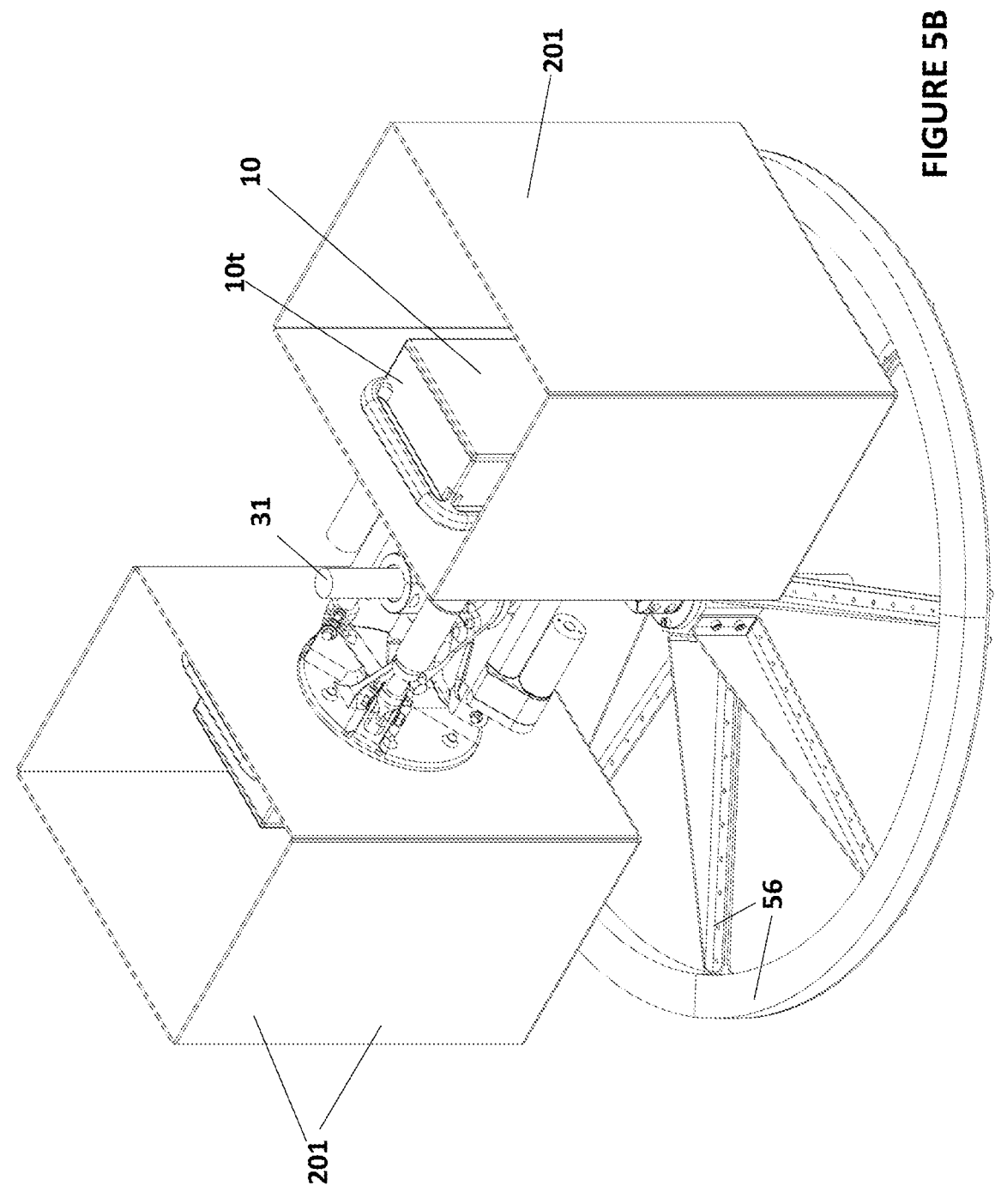
FIG. 5B is a perspective view of the same subassembly as given in FIG. 5A with simplified representations of the vapor chambers added (vapor chamber tops removed to show features inside).
Figure 6A:
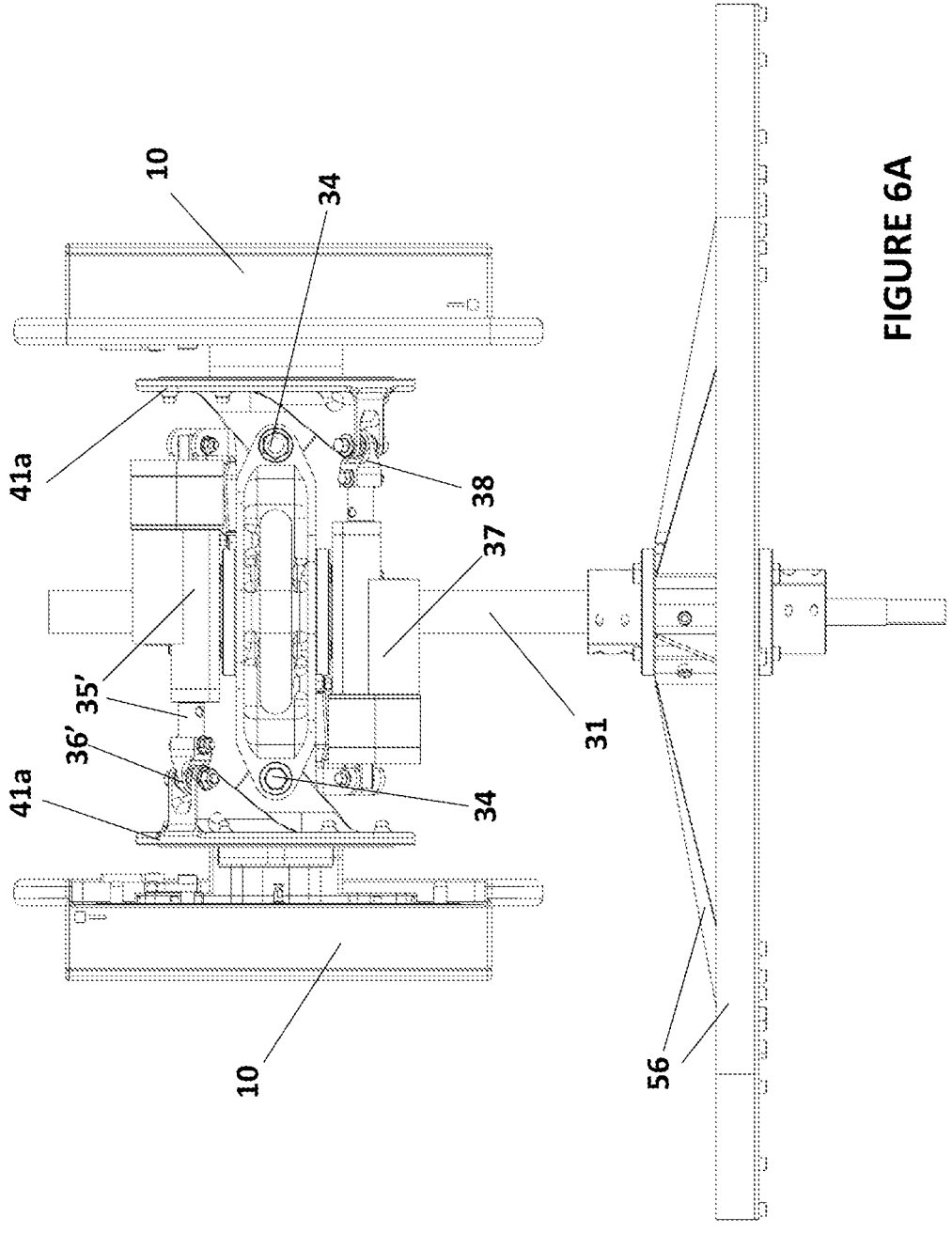
FIG. 6A is a side view of the subassembly of FIG. 5A.
Figure 6B:
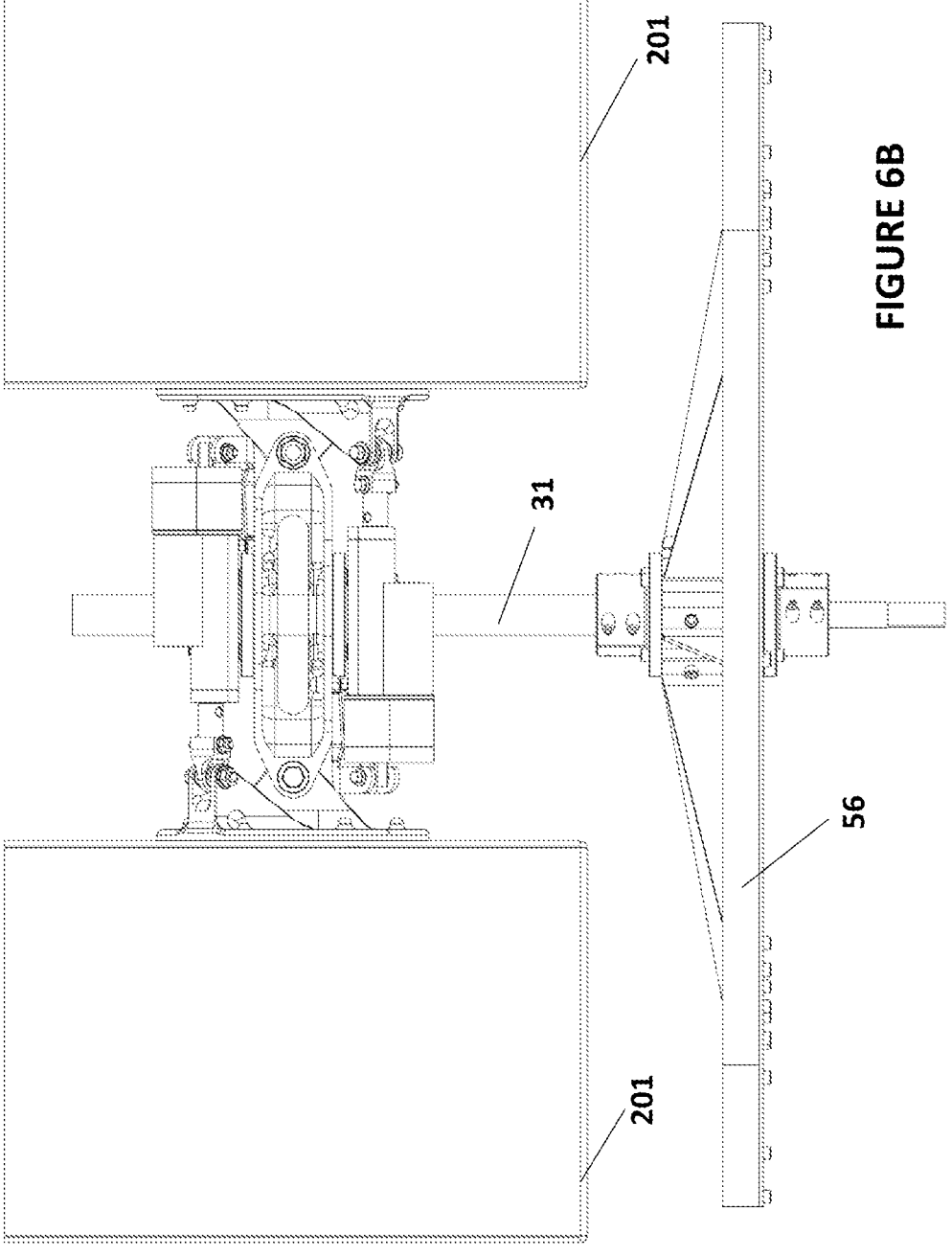
FIG. 6B is a side view of the subassembly of FIG. 5B.
Figure 7A:
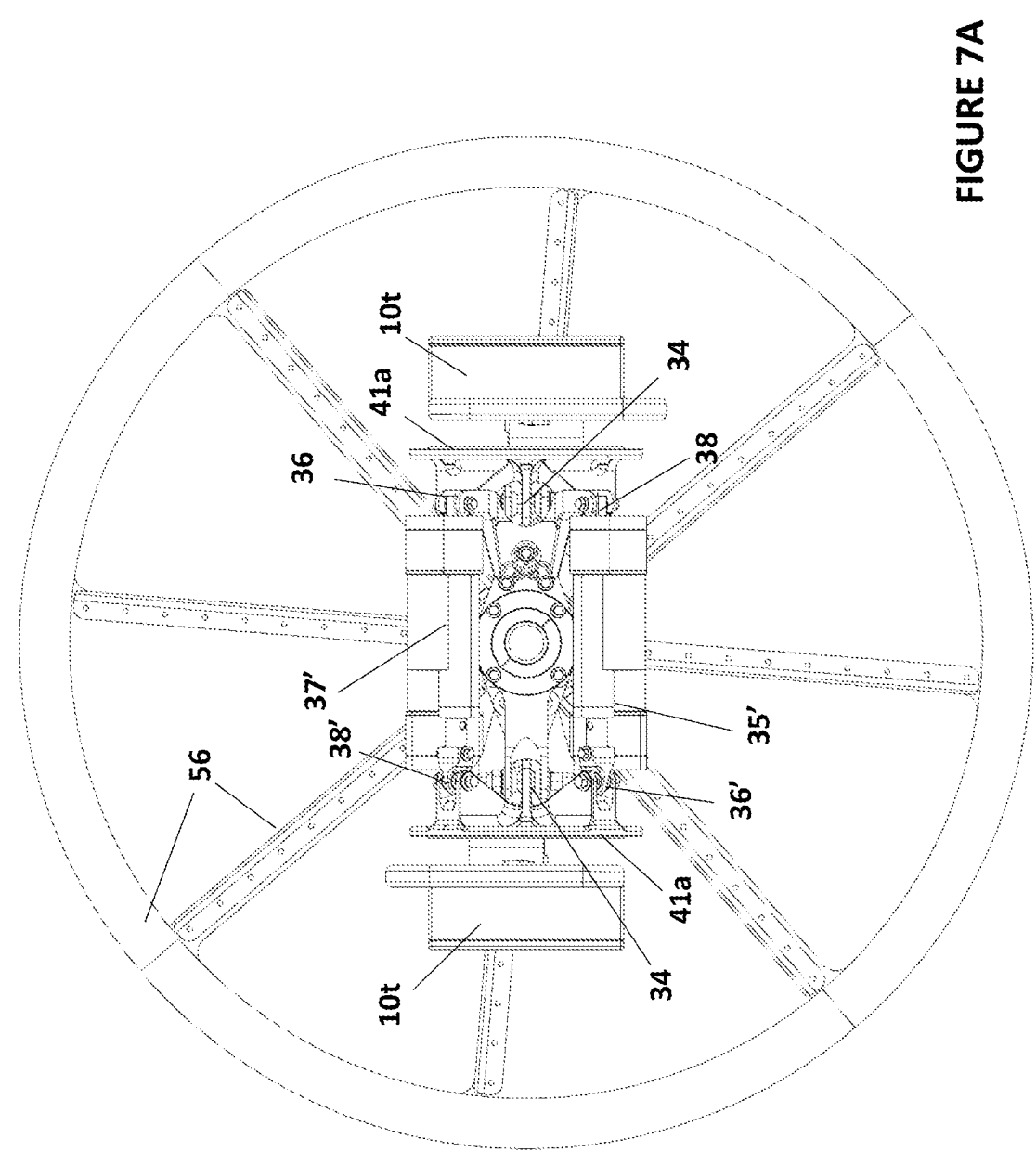
FIG. 7A is a top plan view of the subassembly of FIG. 5A.
Figure 7B:
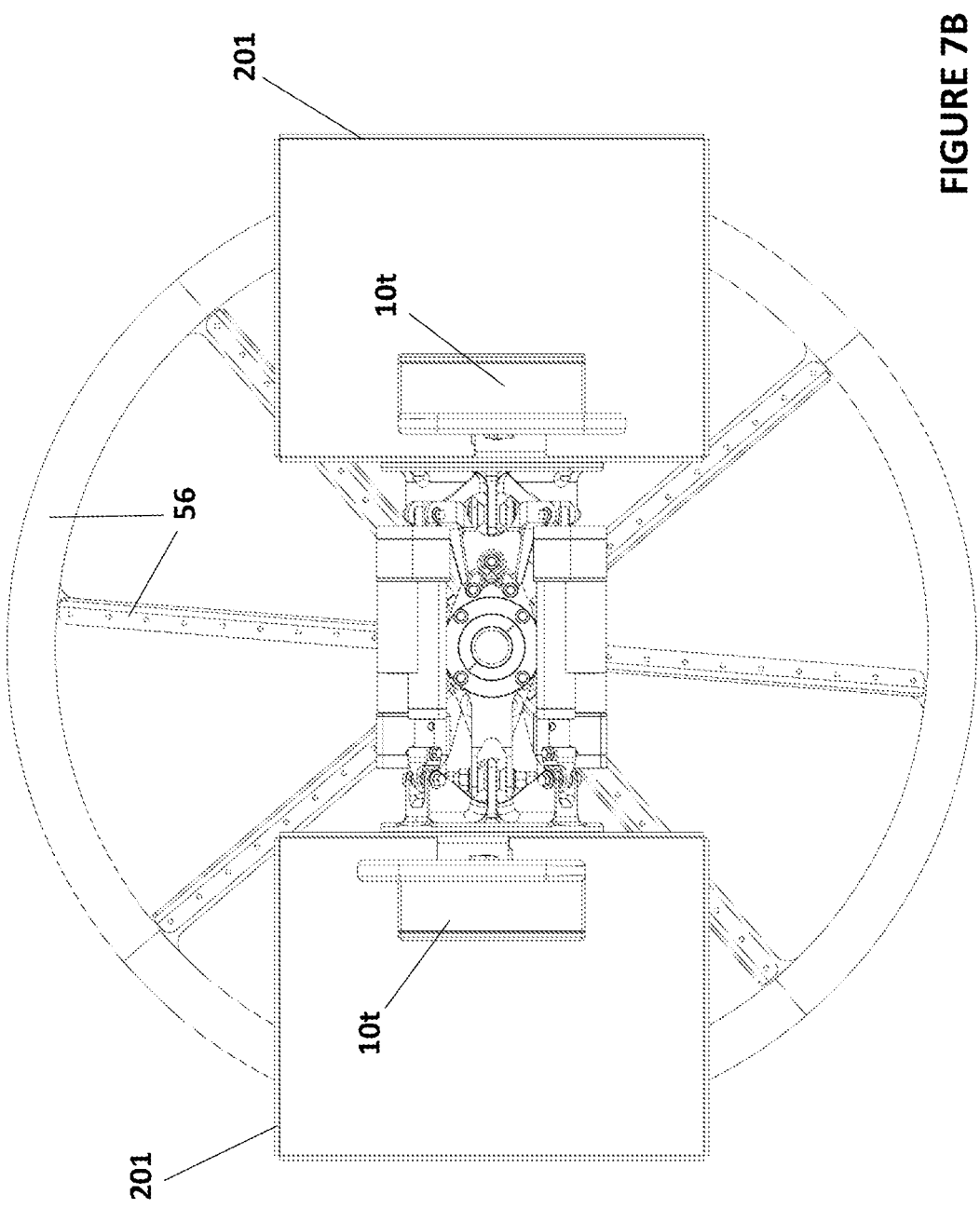
FIG. 7B is a top plan view of the subassembly of FIG. 5B.

Embodiments of the foregoing incorporating an adjustable mount are given in FIGS. 2A-2B, with the operation thereof further described in FIGS. 3A-3D and FIGS. 4A-4B, and examples of that embodiment given in FIGS. 5A-7B.

As noted above, some embodiments of the present invention are directed to an apparatus for separating residual resin from additively manufactured objects, the apparatus including: a rotor 31; first and second carrier platform mount assemblies each including a dynamic mount 41*a* connected to the rotor, each carrier platform mount assembly configured to have a carrier platform 10 connected thereto; a plurality of actuators 35, 35', 37, 37' configured to engage each carrier platform mount assembly to thereby rotate the carrier platform mount assembly and the carrier platform connected thereto about first and second axes. Suitable actuators include, but are not limited to, linear actuators such as Firgelli linear actuators, available from Firgelli Automations, 1350 Slater Road, Unit 11 &12, Ferndale, WA 98248 USA.

As noted above, the apparatus further includes a drive assembly 55 configured to spin the rotor while the actuators rotate the carrier platform mount assemblies.

In some embodiments, the apparatus further includes at least one controller 57 operatively associated with the drive assembly and/or the actuators. Connection from the controller to the rotating actuators can be made through a slip ring 58 in accordance with known techniques. Suitable slip rings (for both electrical and fluid systems) include but are not limited to those available from Dynamic Sealing Technology Inc. (DSTI), 13829 Jay Street NW, Andover, MN 55304 USA.

In some embodiments, the first axis is a horizontal axis (e.g., pitch axis, as shown by the dashed line in FIGS. 3A-3B) and the second axis is a vertical axis (e.g., yaw axis, as shown by the dashed lines in FIGS. 3C-3D).

In some embodiments, the actuators are configured to repeatedly rotate each carrier platform mount assembly about each axis alternately in a first direction and a second, opposite direction.

In some embodiments, the actuators are configured to rotate the first and second carrier platform mount assemblies simultaneously about the first axis in the same direction and are configured to rotate the first and second carrier platform mount assemblies simultaneously about the second axis in opposite directions. For example, in some embodiments, the actuators for each opposing build platform mount are configured so that they rotate the platforms so as to maintain balance about the center axis, when rotated around either the pitch or yaw axis, as schematically illustrated in FIGS. 4A-4B. This can be achieved by delivering equivalent actuator signals, for equivalent linear translation, to actuator pair 35, 35' and actuator pair 37, 37'.

In some embodiments, each carrier platform mount assembly includes a dynamic mount 41*a* having first and second opposite sides or surfaces, with the first surface configured to have the carrier platform 10 connected thereto. A static mount 32*a* may be fixed to the rotor.

In some embodiments, the plurality of actuators include first and second actuators 35, 37, 35', 37' for each carrier platform mount assembly. The apparatus may optionally further include ball joints including an arm or strut 36*a*, 36*a'*, 38a, 38a' and a spherical bearing 36, 36', 38, 38', with the arms 36a, 36a', 38a, 38a' extending between the actuators 35, 35', 37, 37' and the spherical bearings 36, 36', 38, 38'. The spherical bearings 36, 38 may be at the second surface of one of the dynamic mounts 41a, and the spherical bearings 36', 38' may be at the second surface of the other one of the dynamic mounts 41a. It is noted that in some embodiments the ball joints may be omitted and the arms 36a, 36a', 38a, 38a' may be part of or a subcomponent of the actuators 35, 37, 35', 37' and engage the spherical bearings 36, 36', 38, 38'. That is, the actuator may include a main body 35, 37, 35', 37' and an arm (or drive arm) 36a, 36a', 38a, 38a' extending from the main body, e.g., to the spherical bearing 36, 36', 38, 38'. A static arm or strut 33 may interconnect the static mount 32a to a third spherical bearing 34 at the second surface of the dynamic mount 41a to provide three points of contact at the dynamic mount.

In some embodiments, the first and second spherical bearings 36, 38 are offset from a centerline of the dynamic mount, and preferably at a right angle to (or define a right angle with) the third spherical bearing 34.

Methods. Some embodiments of the present invention are directed to a method of cleaning residual resin from an additively manufactured object, the method including: producing by additive manufacturing (that is, stereolithography) at least one object on at least one carrier platform, each object including a light polymerized resin with a surface coating of viscous, unpolymerized residual resin; operatively connecting each object to a rotor; separating the residual resin from each object; and removing the at least one object from the rotor with the residual resin separated therefrom. The separating step may include: centrifugally separating the residual resin from each object by spinning the rotor with the at least object operatively connected thereto; and rotating (or tilting) each object about at least one axis during the spinning to enhance the centrifugally separating the residual resin from each object.

In some embodiments: operatively connecting each object to the rotor includes operatively connecting each carrier platform to the rotor, rotating (or tilting) each object includes rotating (or tilting) each carrier platform, and/or removing the at least one object from the rotor includes removing the at least one carrier platform from the rotor.

In some embodiments, the rotating step includes rotating each carrier platform about each axis in a repeating pattern of rotating the carrier platform in a first direction and then rotating the carrier platform in a second, opposite direction.

In some embodiments, the rotating step includes rotating each carrier platform about first and second axes (e.g., simultaneously).

In some embodiments, the at least one carrier platform includes first and second carrier platforms disposed on diametrically opposed sides of the rotor.

In some embodiments, the rotating step includes: rotating the first and second carrier platforms about the first axis simultaneously in the same direction; and/or rotating the first and second carrier platforms about the second axis simultaneously in opposite directions.

In some embodiments, the first axis is a horizontal axis (e.g., pitch axis) and the second axis is a vertical axis (e.g., yaw axis).

In some embodiments, the rotating step is carried out with a plurality of actuators engaging a dynamic mount to which the carrier platform is operatively connected.

In some embodiments, the method further includes receiving each carrier platform in at least one vapor chamber to operatively connect each carrier platform to the rotor.

In some embodiments, the method further includes flooding the at least one vapor chamber with a volatile organic solvent vapor without contacting liquid organic solvent to the object, with the vapor present in an amount sufficient to reduce the viscosity of the residual resin.

In some embodiments, operatively connecting each object to the rotor includes positioning each object in or on a connection feature (e.g., a basket, a cage, a rack, an engagement feature such as a rod or skewer, etc.). In some embodiments, rotating (or tilting) each object includes rotating (or tilting) the connection feature.

C. Cleaning Apparatus Incorporating Internal Vapor Chamber(s) within Spin Chamber.

Figure 8A:
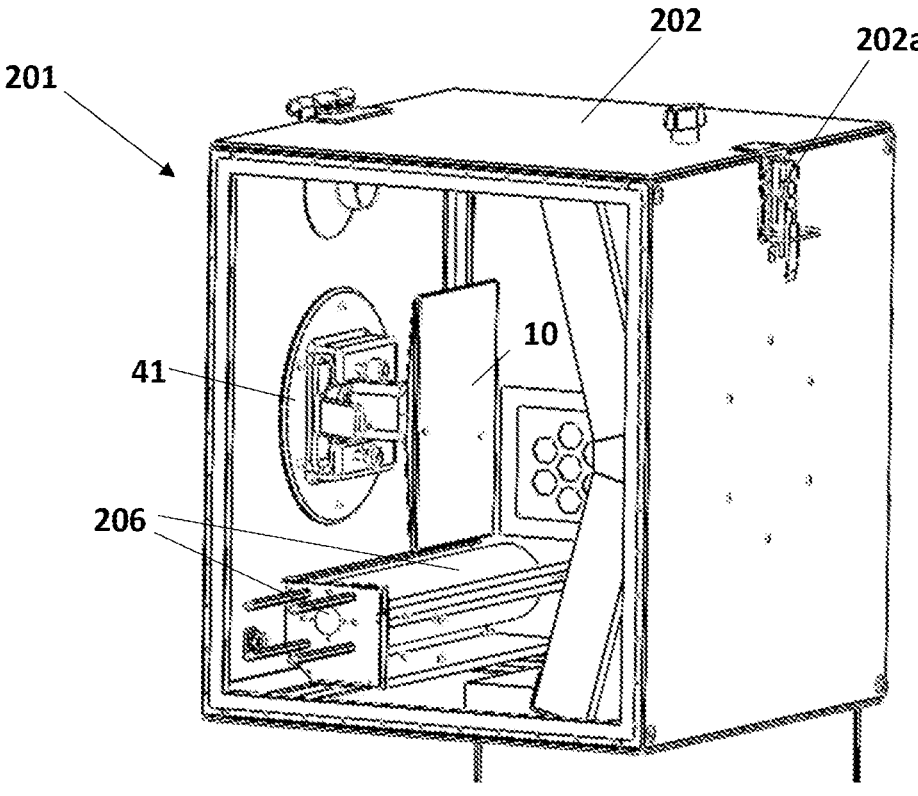
FIG. 8A is a perspective view of a vapor chamber subassembly as described herein, with one side panel removed to show internal features.
Figure 8B:
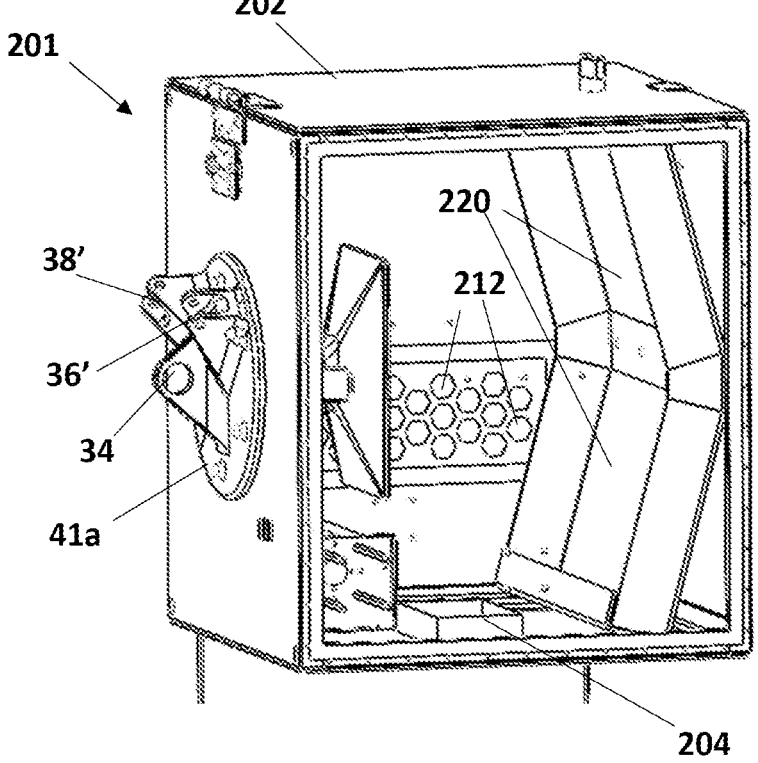
FIG. 8B is an alternate perspective view of the subassembly of FIG. 8A.
Figure 8C:
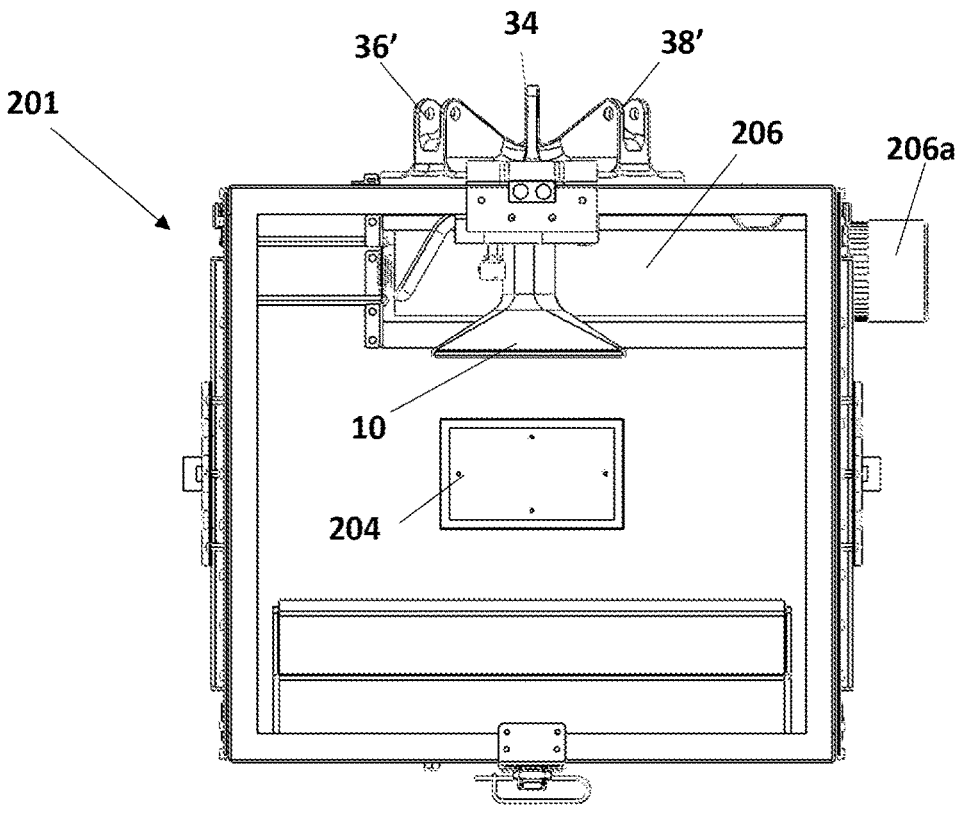
FIG. 8C is a top plan view of the subassembly of FIGS. 8A-8B, with the top access door shown transparent.
Figure 8D:
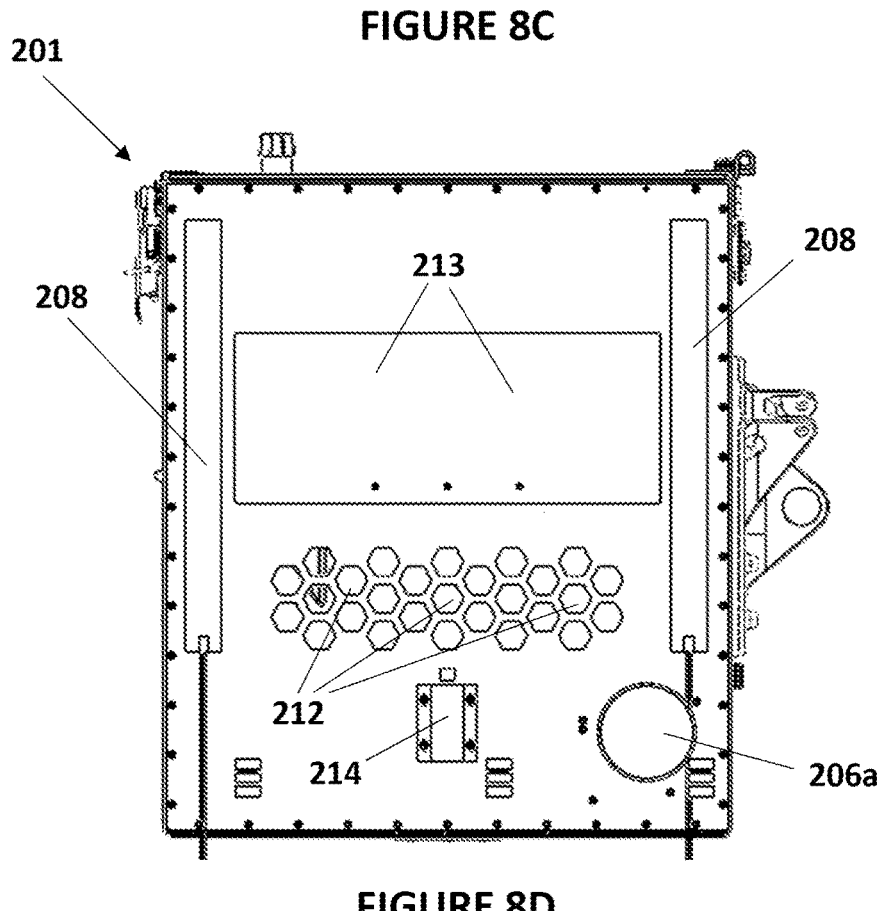
FIG. 8D is a side view of the apparatus of FIGS. 8A-8C, with the side vent shown and the vent door in the open position (a corresponding vent and door is on the opposite side).
Figure 8E:
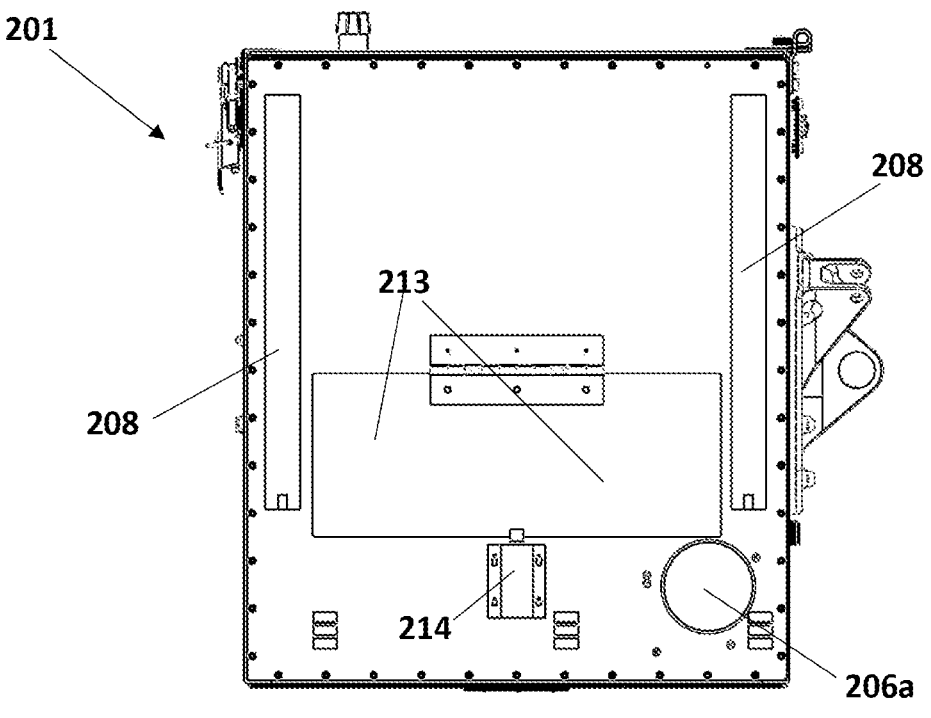
FIG. 8E is a side view of the apparatus of FIGS. 8A-8C with the side vent door in the closed position.
Figure 9:
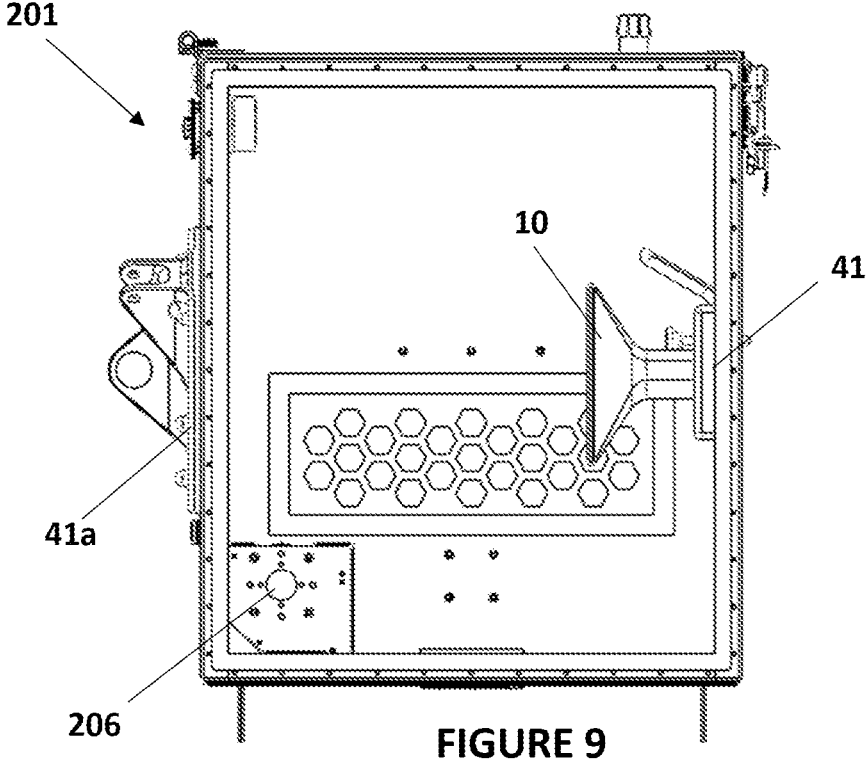
FIG. 9 is a side view of an alternate embodiment of the subassembly, with the build platform mount positioned so that the build platform faces toward the axis of rotation.

As noted above (and with certain feature of a preferred embodiment further illustrated in FIGS. 8A-9), also described herein is an apparatus for separating residual resin from additively manufactured objects, the apparatus including: (a) a spin chamber 101; (b) a spin rotor 31 in the chamber; (c) at least two mount assemblies 32 and/or 41 (or 41a) operatively associated with the spin rotor, each mount assembly configured for receiving at least one additively manufactured object 11; and (d) at least one (e.g., one, two, three, or four) vapor chamber(s) 201 operatively associated with the spin rotor and configured to spin with the spin rotor within the spin chamber (and optionally, but in some embodiments preferably, with the spin rotor positioned outside each vapor chamber), the at least one vapor chamber operatively associated with each of the mount assemblies and configured with the mount assembly to receive at least one additively manufactured object 11 within the vapor chamber; and (e) an organic solvent vapor generator 204 operatively associated with each vapor chamber.

As illustrated the vapor generator comprises a container such as a box or cage 204 at the bottom of the chamber into which a wick material saturated with or carrying the organic solvent can be placed. A heater 208 may be operatively associated with the container (such as by securing a resistive heater to the outside surface of the vapor chamber beneath the container. However, any of a variety of vapor generators may be used, including but not limited to foggers and misters such as a McMaster-Carr impaction pin fogging nozzle, or any of the fogging nozzles described in U.S. Pat. Nos. 5,620,142; 6,722,588; and 7,320,443. Liquid may be supplied to the nozzles during rotation through a liquid slip ring in accordance with known techniques. Additional aspects of vapor generation are discussed further below.

In some embodiments, the mount assembly comprises a carrier platform mount assembly 41, with the vapor chamber configured with the mount assembly to receive a carrier platform having additively manufactured objects formed thereon within the vapor chamber, with the carrier platform removably connected to the mount assembly. However, alternative embodiments can also be used when it is preferable to remove the additively manufactured objects from the carrier platform on which they were produced, such as baskets, racks, cages, skewers or other engagement features (see, for example, Day, Tucker, and Kwak US Patent Application Pub. No. US 2021/0323234).

A purpose of the internal vapor chamber is to reduce and/or further contain the volume of vapor in the larger apparatus. Accordingly, in some embodiments, the spin chamber has an internal volume, the at least one vapor chamber has an internal volume, and the total internal volume of all of the at least one vapor chambers is not more than, or less than, than one half (½) or two thirds (⅔) the internal volume of the spin chamber (and optionally, but in some embodiments preferably, wherein the total internal volume of all of the at least one vapor chambers is not less than, or at least, one fifth (⅕) or one quarter (¼) of the internal volume of the spin chamber).

In some embodiments, the apparatus further includes at least one heater 208 operatively associated with each vapor chamber. The heater may advantageously facilitate vapor formation and/or the concentration of the vapor in the atmosphere within the vapor chamber. Any suitable heater may be used, including but not limited to resistive heaters, infrared heaters, thermoelectric devices, etc. In some embodiments, the heater(s) is positioned on the outside surface portion of each vapor chamber, to thereby reduce the number of electrical connections within the vapor chamber. In other embodiments, the heater can be placed within or associated with the blower discussed below.

In some embodiments, the apparatus includes a blower 206 operatively associated with each the at least one vapor chamber and configured for circulating organic solvent vapor within each vapor chamber (as the solvent vapor can otherwise be unevenly distributed within the vapor chamber by centrifugal force during spinning). Typically, the blower comprises a motor operatively connected to a fan, with the motor 206a optionally, but in some embodiments preferably, positioned on the outside surface portion of each vapor chamber while the fan is positioned inside the vapor chamber (again so that electrical connections are outside the vapor chamber).

In some embodiments, the vapor chamber includes at least one internal vent opening (e.g., a pair of opposite facing internal vent openings 212) formed on each of the at least one vapor chambers, each the internal vent openings having a seal mechanism (e.g., a door, shutter, diaphragm, or the like 213) operatively associated therewith, the seal mechanism switchable between a closed configuration in which solvent vapor is retained in each vapor chamber and an open configuration in which solvent vapor can be flushed from each vapor chamber. The door may be closed by a manual or automated latch 214 such as an electrically controlled solenoid so that venting of vapor at the conclusion of a centrifugal separation cycle (e.g., by opening the door and spinning the vapor chamber at a slower speed of rotation within the spin chamber) so that the vapor is flushed into the spin chamber and exits the spin chamber through vent 103. An inert gas supply (not shown) such as a nitrogen or argon supply, may be connected to the spin chamber to further flush the solvent vapor.

Note that, while in the embodiments of FIGS. 8A-8E the build platform mount 41 is configured so that the build platform 10 faces away from the rotor 31 and axis of rotation, in the embodiment of FIG. 9 the build platform mount 41 is configured so that the build platform 10 faces towards the rotor 31 and axis of rotation. Either orientation can be used, depending upon the configuration of the object to be cleaned, along with other factors such as the viscosity of the resin, the accuracy required of the part, the speed of spinning, etc.

In some embodiments, the apparatus includes at least one actuator, or a plurality of actuators, configured to engage each mount assembly to thereby rotate the mount assembly about at least one axis, or about first and second axes (and optionally, but in some embodiments preferably, with the actuator(s) positioned outside of each the at least one vapor chamber). Examples of suitable actuator assemblies are given in Section B above.

In some embodiments the apparatus includes a balancer 56 such as described above operatively associated with the spin rotor.

As noted above, in some embodiments the apparatus includes an external vent opening 103 formed on the spin chamber. In addition, in some embodiments the apparatus includes a pressure relief port formed in the spin chamber, the relief port having a frangible vapor barrier 105 connected thereto (and in some embodiments, the pressure relief port further having a flame arrestor 106 operatively associated therewith).

The apparatus can include an access door 102 on the spin chamber configured for passage of the carrier platform having additively manufactured objects formed thereon; and an access door 202 (optionally with a latch 202a) on each the at least one vapor chamber configured for passage of the carrier platform having additively manufactured objects formed thereon.

In the embodiments of FIG. 8A-8E an optional resin catch pan 220 is included. The resin catch pan is configured to receive at least a portion, and preferably a major portion, of residual resin separated from the additively manufactured objects during the centrifugal separating step, as an aid to keeping the internal vapor chamber clean.

Methods. Also provided herein is a method of cleaning residual resin from an additively manufactured object. The method includes the steps of: stereolithographically producing at least one object, each object comprising a light polymerized resin with a surface coating of viscous, unpolymerized residual resin; receiving each object in at least one vapor chamber that is operatively connected to a rotor; then closing the at least one object within the at least one vapor chamber; optionally, but preferably, closing the at least one vapor chamber within a spin chamber; generating an organic solvent vapor in the at least one vapor chamber effective to reduce the viscosity of the unpolymerized residual resin; and centrifugally separating the residual resin from the at least one object by spinning the rotor, thereby also spinning the at least one vapor chamber with the at least one object therein; and then opening the at least one vapor chamber (and the spin chamber where present and when previously closed), and removing each at least one object therefrom.

In some embodiments, each object is produced on at least one carrier platform, and the object is received in the vapor chamber by receiving the carrier platform with the object thereon in the vapor chamber.

Any suitable volatile organic solvent can be used in the process, and the specific choice will depend upon factors such as the polymerizable resin used, the intended use of the additively manufactured product. Suitable volatile organic solvents include those set forth in U.S. Pat. No. 10,343,331, the disclosure of which is incorporated herein by reference. Particular examples of suitable solvents include, but are not limited to, an acetates, alcohols, saturated or unsaturated hydrocarbons, ethers, and combinations thereof (e.g. ethyl acetate, isopropyl acetate, propyl acetate, butyl acetate, hexane, heptane, octane, isooctane (2,2,4 trimethylpentane), and combinations thereof).

An object of delivering an organic solvent vapor (as opposed to washing by immersion in a solvent or spraying a liquid solvent onto objects being spun) is to reduce extraction of components in the object itself (which may be detrimental to ultimate strength or properties of the finished object) while still facilitating removal of residual resin from the surface of the object. In some embodiments, the organic solvent vapor is generated by evaporation of an organic solvent liquid (e.g., the liquid in a pool, a liquid stream such as a stream flowing over a heated or unheated surface such as a metal surface, evaporation from liquid solvent absorbed into and/or absorbed onto an optionally heated wick, etc.). In other embodiments, the organic solvent vapor is generated by (i) producing an aerosol suspension (or mist) of the organic solvent in the vapor chamber from an organic solvent liquid, and then (ii) evaporating at least some of the aerosol suspension (or mist) to produce the organic solvent vapor (optionally but in some embodiments preferably by heating the chamber).

In some embodiments, the method further includes the step of heating each at least one vapor chamber (e.g., during said generating step and/or said centrifugally separating step). An object of heating is to increase the concentration of solvent vapor during the separating step.

An object of inclusion of a vapor chamber or chambers within the s spin chamber is, as noted above, to reduce the total volume of solvent vapor employed, while still facilitating cleaning of the objects. Hence, in some embodiments, where the spin chamber is included, the total internal volume of all of the at least one vapor chambers is not more than, or less than, one half (½) or two thirds (⅔) the internal volume of the spin chamber. And in some preferred embodiments, the total internal volume of all of the at least one vapor chambers is not less than, or at least, one fifth (⅕) or one quarter (¼) of the internal volume of the spin chamber.

As indicated above, in some embodiments the method further includes circulating the organic solvent vapor within each the at least one vapor chamber during the centrifugally separating step (e.g., with a blower operatively associated with the vapor chamber).

As also suggested above, in some embodiments the method further includes an additional step, after centrifugally separating but before the opening step, of: venting the organic solvent vapor from the at least one vapor chamber (e.g., by opening vent, and from the spin chamber when present.

3. Further Curing.

In the case of dual cure resins, once the intermediate object has been formed and cleaned as described above, the object is then further cured, such as by heating and/or by contacting to water, such as described in U.S. Pat. No. 9,598,606. Heating may be active heating (e.g., baking in an oven, such as an electric, gas, solar oven, or microwave oven, or combination thereof), or passive heating (e.g., at ambient (room) temperature). Active heating will generally be more rapid than passive heating and is typically preferred, but passive heating—such as simply maintaining the intermediate at ambient temperature for a sufficient time to effect further cure—may in some embodiments also be employed.

4. Objects for Cleaning.

The methods and apparatus described herein can be used to clean any of a variety of additively manufactured objects. The objects typically comprise a plurality of surface portions oriented differently from one another (e.g., interior and exterior surfaces; horizontal and vertical surfaces; surfaces oriented at obtuse, acute, or right angles to one another; different sections of convex or concave curved surface portions; and combinations of the foregoing). Particular examples of objects to be cleaned include, but are not limited to, electrical, mechanical, and fluid connectors, fluid conduits, cushions comprised of a lattice of interconnected struts and/or a triply periodic surface lattices, thermoforming molds for dental appliances, and the like.

The foregoing is illustrative of the present invention, and is not to be construed as limiting thereof. The invention is defined by the following claims, with equivalents of the claims to be included therein.

We claim:

1. A method of cleaning residual resin from at least one additively manufactured object, the method comprising:
   stereolithographically producing at least one object on at least one carrier platform, each object comprising a light polymerized resin with a surface coating of viscous, unpolymerized residual resin;
   operatively connecting each said object to a rotor including connecting said at least one carrier platform to a dynamic mount connected to said rotor;
   separating said residual resin from each said object, wherein said separating step comprises:
      centrifugally separating said residual resin from each said object by spinning said rotor with said at least object operatively connected thereto; and
      rotating each said object about first and second axes during said spinning to enhance said centrifugally separating said residual resin from each said object; and
   removing said at least one object from said rotor with said residual resin separated therefrom,
   wherein said rotating step is carried out with first and second actuators contacting and engaging said dynamic mount to rotate said dynamic mount and each said object about said first and second axes.

2. The method of claim 1 wherein:
   operatively connecting each said object to the rotor comprises operatively connecting each said carrier platform to the rotor,
   rotating each said object comprises rotating each said carrier platform, and/or
   removing said at least one object from said rotor comprises removing said at least one carrier platform from said rotor.

3. The method of claim 2 wherein said rotating step comprises rotating each said carrier platform about each said axis in a repeating pattern of rotating said carrier platform in a first direction and then rotating said carrier platform in a second, opposite direction.

4. The method of claim 1 wherein said at least one carrier platform comprises first and second carrier platforms disposed on diametrically opposed sides of said rotor.

5. The method of claim 4 wherein said rotating step comprises:
   rotating said first and second carrier platforms about the first axis simultaneously in the same direction; and
   rotating said first and second carrier platforms about the second axis simultaneously in opposite directions.

6. The method of claim 5 wherein said first axis is a horizontal axis and said second axis is a vertical axis.

7. The method of claim 1 further comprising receiving each said carrier platform in at least one vapor chamber to operatively connect each said carrier platform to the rotor.

8. The method of claim 7 further comprising flooding said at least one vapor chamber with a volatile organic solvent vapor, the vapor present in an amount sufficient to reduce the viscosity of said residual resin.

\* \* \* \* \*